United States Patent
Endoh et al.

(10) Patent No.: US 9,189,684 B2
(45) Date of Patent: Nov. 17, 2015

(54) BIOMETRIC AUTHENTICATION DEVICE, BIOMETRIC AUTHENTICATION METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Toshio Endoh, Yokohama (JP); Takashi Shinzaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 13/928,927

(22) Filed: Jun. 27, 2013

(65) Prior Publication Data

US 2013/0287268 A1 Oct. 31, 2013

Related U.S. Application Data

(63) Continuation of application No. PCT/JP2010/073756, filed on Dec. 28, 2010.

(51) Int. Cl.
*G06K 9/00* (2006.01)

(52) U.S. Cl.
CPC ........ *G06K 9/00362* (2013.01); *G06K 9/00013* (2013.01); *G06K 9/00033* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 6,173,068 | B1 * | 1/2001 | Prokoski | 382/115 |
| 6,301,375 | B1 * | 10/2001 | Choi | 382/115 |
| 8,000,503 | B2 * | 8/2011 | Kamata et al. | 382/115 |
| 8,326,005 | B2 * | 12/2012 | Tani | 382/126 |
| 8,649,569 | B2 * | 2/2014 | Shindo et al. | 382/115 |
| 2002/0048014 | A1 * | 4/2002 | Kono et al. | 356/71 |
| 2004/0001617 | A1 * | 1/2004 | Blume | 382/126 |
| 2005/0084140 | A1 * | 4/2005 | Kakadiaris et al. | 382/118 |
| 2005/0148876 | A1 * | 7/2005 | Endoh et al. | 600/454 |
| 2010/0189313 | A1 * | 7/2010 | Prokoski | 382/118 |

(Continued)

FOREIGN PATENT DOCUMENTS

| | | |
|---|---|---|
| JP | 2001-222716 | 8/2001 |
| JP | 2004-5509 | 1/2004 |

(Continued)

OTHER PUBLICATIONS

International Search Report mailed Feb. 1, 2011 in corresponding International Application No. PCT/JP2010/073756.

*Primary Examiner* — Randolph I Chu
(74) *Attorney, Agent, or Firm* — Staas & Halsey LLP

(57) ABSTRACT

A biometric authentication device includes: a storage unit configured to store a three-dimensional shape of a posture of a body of a user; a three-dimensional shape calculation unit configured to calculate a three-dimensional shape of a body from biometric information of the user detected by a biometric sensor; a posture calculation unit configured to calculate a posture of the body from the biometric information detected by the biometric sensor; a synthesis unit configured to synthesize a three-dimensional shape from the three-dimensional shape stored in the storage unit in accordance with the posture calculated by the posture calculation unit; and a comparison unit configured to compare the three-dimensional shape calculated by the three-dimensional shape calculation unit with the three-dimensional shape synthesized by the synthesis unit.

9 Claims, 11 Drawing Sheets

(56) References Cited

U.S. PATENT DOCUMENTS

2012/0076369 A1* 3/2012 Abramovich et al. ........ 382/124
2012/0242800 A1* 9/2012 Ionescu et al. .................. 348/46

FOREIGN PATENT DOCUMENTS

| JP | 2007-164669 | 6/2007 |
|---|---|---|
| WO | WO 2004/021884 | 3/2004 |

* cited by examiner

BIOMETRIC AUTHENTICATION DEVICE, BIOMETRIC AUTHENTICATION METHOD, AND NON-TRANSITORY COMPUTER-READABLE RECORDING MEDIUM

CROSS-REFERENCE TO RELATED APPLICATIONS

This application is a continuation application of International Application PCT/JP2010/073756 filed on Dec. 28, 2010 and designated the U.S., the entire contents of which are incorporated herein by reference.

FIELD

A certain aspect of the embodiments is related to a biometric authentication device, a biometric authentication method and a non-transitory computer-readable recording medium.

BACKGROUND

A personal authentication technology using personal biometric information such as a finger print, a face, an iris or a vein is used as a method of authenticating a person when entering facilities or leaving from facilities without one's work. The personal authentication using the biometric information has an advantage of free from worry such as loss or plagiarism, being different from a case where a magnetic card or a secret number is used.

A device collecting biometric information is loosely classified into a contact type and a non-contact type in accordance with a difference of measuring methods. A device to which a body is contact is the contact type device. A device to which a body is not contact is the non-contact type device. It is necessary to perform a large indefinite number of personal authentication with respect to an administration of entering facilities or leaving from facilities. It is therefore preferable that the non-contact type device is used, in view of an aspect of hygiene or a psychological resistance of a user. With the non-contact type device, a shape of a held body or a positional relation with the device (a position or a direction) tends to fluctuate. The position, the direction and the shape of the body are generally named a posture of the body. The fluctuation of the posture causes a degradation of authentication accuracy. Therefore, a handling is needed.

International Publication Pamphlet No. WO2004/021884 (hereinafter referred to as Patent Document 1) discloses a stabilization of a posture by providing a guide of a hand or feed-backing to a user. Patent Document 1 also discloses a technology in which a vein pattern is three-dimensionally obtained. Japanese Laid-open Patent Publication No. 2004-005509 "hereinafter referred to as Patent Document 2) discloses a technology in which a registered data is generated with respect to various postures and the most similar registered data is used during an authentication.

SUMMARY

According to an aspect of the present invention, there is provided a biometric authentication device including: a storage unit configured to store a three-dimensional shape of a posture of a body of a user; a three-dimensional shape calculation unit configured to calculate a three-dimensional shape of a body from biometric information of the user detected by a biometric sensor; a posture calculation unit configured to calculate a posture of the body from the biometric information detected by the biometric sensor; a synthesis unit configured to synthesize a three-dimensional shape from the three-dimensional shape stored in the storage unit in accordance with the posture calculated by the posture calculation unit; and a comparison unit configured to compare the three-dimensional shape calculated by the three-dimensional shape calculation unit with the three-dimensional shape synthesized by the synthesis unit.

According to an aspect of the present invention, there is provided a biometric authentication method including: calculating a three-dimensional shape of a body from biometric information of a user detected by a biometric sensor; calculating a posture of the body from the biometric information detected by the biometric sensor; synthesizing a three-dimensional shape from the three-dimensional shape of a posture of a body of the user stored in a storage unit in accordance with the calculated posture; and comparing the three-dimensional shape calculated from the biometric information of the user with the synthesized three-dimensional shape.

According to an aspect of the present invention, there is provided a non-transitory computer-readable recording medium having stored therein a program for causing a computer to execute a process, the process including: calculating a three-dimensional shape of a body from biometric information of a user detected by a biometric sensor; calculating a posture of the body from the biometric information detected by the biometric sensor; synthesizing a three-dimensional shape from the three-dimensional shape of a posture of a body of the user stored in a storage unit in accordance with the calculated posture; and comparing the three-dimensional shape calculated from the biometric information of the user with the synthesized three-dimensional shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments of the invention, with reference to drawings.

Embodiment 1

Figure 1A:
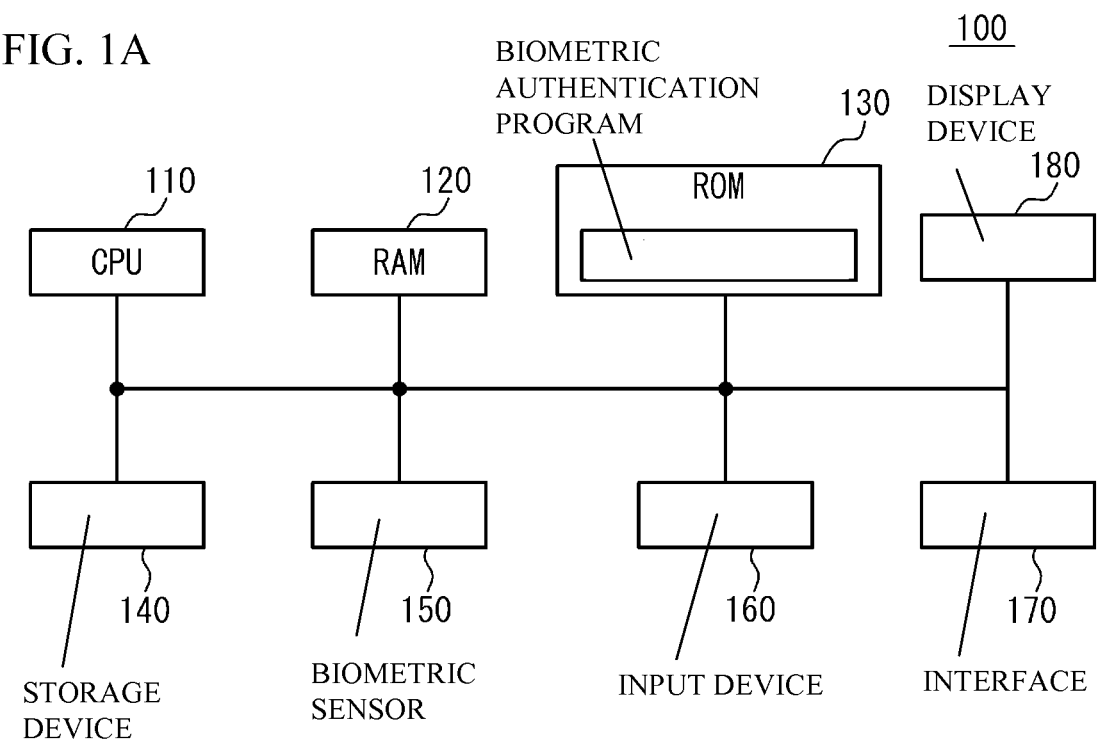
FIG. 1A illustrates a block diagram for describing a hardware structure of a biometric authentication device in accordance with an embodiment 1.

FIG. 1A illustrates a block diagram for describing a hardware structure of a biometric authentication device 100 in accordance with an embodiment 1. As illustrated in FIG. 1A, the biometric authentication device 100 has a CPU 110, a RAM 120, a ROM 130, a storage device 140, a biometric sensor 150, an input device 160, an interface 170 and a display device 180. The components are coupled to each other with a bus or the like.

The CPU 110 is a central processing unit. The CPU 110 has one or more cores. The RAM (Random Access Memory) 120 is a volatile memory that temporarily stores a program executed by the CPU 110, a data processed by the CPU 110, and so on.

The ROM (Read Only Memory) 130 is a non-volatile storage device. The storage device 140 is a non-volatile storage device, and may be a solid state drive (SSD) such as a flash memory, or may be a hard disk driven by a hard disk drive. Further, the storage device 140 may be an outer storage device. The ROM 130 and the storage device 140 may be located in an identical physical address space. The biometric authentication program in accordance with the present embodiment is stored in the ROM 130 or the storage device 140. As an example, in the present embodiment, the ROM 130 stores the biometric authentication program.

Figure 1B:
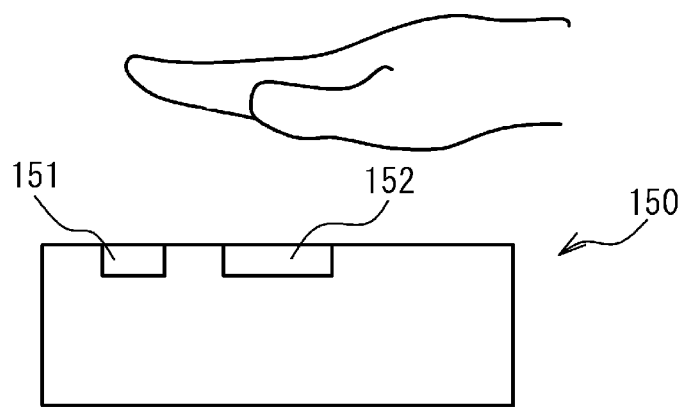
FIG. 1B illustrates a biometric sensor.

The biometric sensor 150 is a sensor that detects biometric information of a user. A finger print, an iris, a face, a vein and so on are included in the biometric information. In the embodiment, as an example, the biometric sensor 150 detects a palm vein. In concrete, as illustrated in FIG. 1B, the biometric sensor 150 has a radiation unit 151 for radiating a light to a palm and an image unit 152 that takes an image of veins of the palm. The radiation unit 151 is, for example, an LED that emits a near-infrared light. The image unit 152 is such a CMOS (Complementary Metal Oxide Semiconductor) camera or a CCD (Charge Coupled Device) camera that has a filter cutting a visible light (a visible-light-cutting filter). An image result is expressed as a two-dimensional image having a value (a pixel value) indicating optical intensity of every pixel.

The input device 160 is such as a keyboard, a mouse, a touch panel, an electrostatic pad or a card reader, and is a device that is capable of inputting an ID, a password or the like of a user. The interface 170 is an interface for transmitting or receiving a signal with an outer component through a network such as a wireless LAN or a wired LAN. The display device 180 is, for example, a liquid crystal display, an electroluminescence panel or the like.

Figure 2:
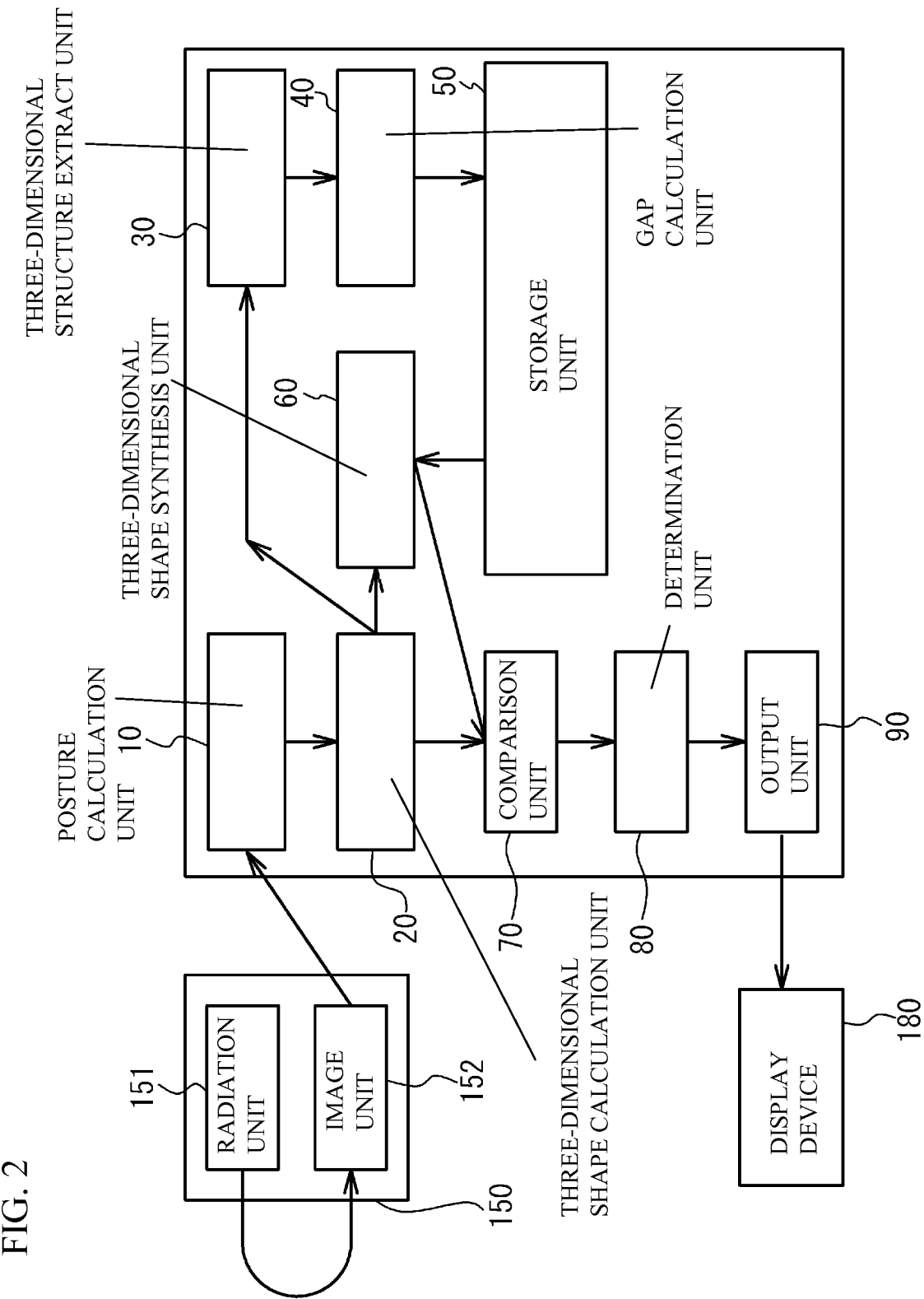
FIG. 2 illustrates a block diagram of each function realized by an execution of a biometric authentication program.

The biometric authentication program stored in the ROM 130 is developed to the RAM 120 so as to be executed. The CPU 110 executes the biometric authentication program developed to the RAM 120. Thus, the biometric authentication device 100 executes each process. FIG. 2 illustrates a block diagram of each function realized by the execution of the biometric authentication program. As illustrated in FIG. 2, the biometric authentication device 100 acts as a posture calculation unit 10, a three-dimensional shape calculation unit 20, a three-dimensional structure extract unit 30, a gap calculation unit 40, a storage unit 50, a three-dimensional shape synthesis unit 60, a comparison unit 70, a determination unit 80 and an output unit 90.

(Registration Process)

Figure 3:
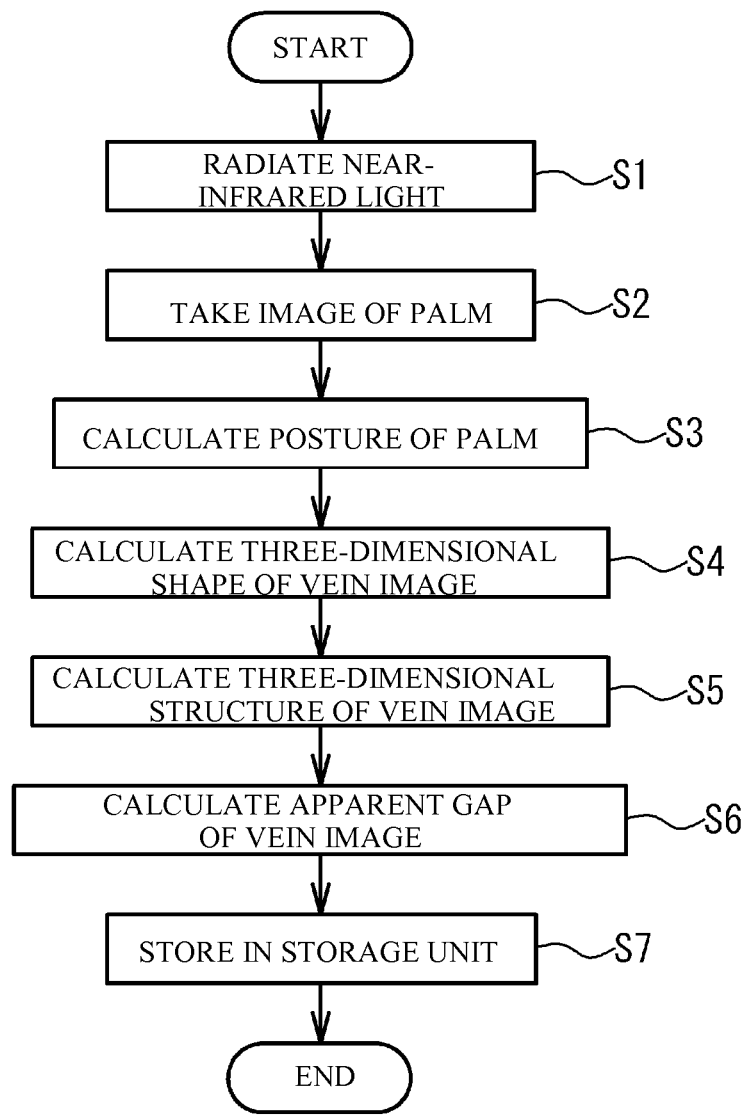
FIG. 3 illustrates an example of a flowchart of a registration process of a registered biometric data.

First, a description will be given of a registration process of a registered biometric data used for an authentication, with reference to FIG. 1 to FIG. 3. FIG. 3 illustrates an example of a flowchart of the registration process of the registered biometric data. The radiation unit 151 radiates a near-infrared light to a palm of a user (Step S1). Next, the image unit 152 takes an image of the palm to which the near-infrared light is radiated (Step S2). Next, the posture calculation unit 10 calculates a posture of the palm (Step S3). Next, the three-dimensional shape calculation unit 20 calculates a three-dimensional shape of a vein pattern of the palm (Step S4).

The three-dimensional structure extract unit 30 calculates a three-dimensional structure of the vein pattern (Step S5). In this case, a three-dimensional shape of a standard posture is used. Next, the gap calculation unit 40 calculates an apparent gap of the vein pattern (Step S6). The "apparent gap" is a difference between a three-dimensional shape and a three-dimensional structure. The storage unit 50 relates the three-dimensional shape calculated in Step S5 and the apparent gap calculated in Step S6 to an ID of the user input by the input device 160, and stores three-dimensional shape and the apparent gap. A description will be given of details of each step of the registration process.

Figure 4:
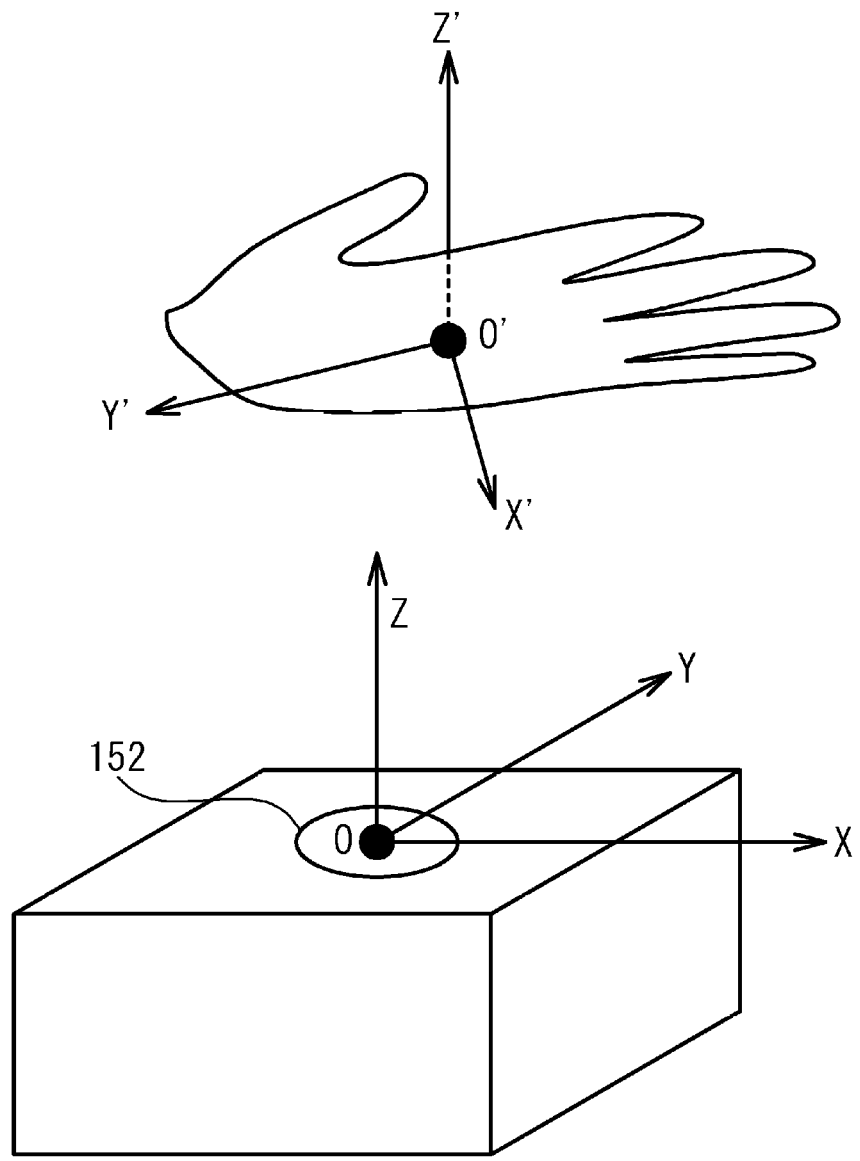
FIG. 4 illustrates a schematic view for describing details of a posture of a palm.

FIG. 4 illustrates a schematic view for describing details of a posture of a palm. The posture of the palm has a positional relation (position and direction) between the image unit 152 and the palm and a shape of the palm. In the embodiment, as an example, a posture is determined with respect to a surface of the palm. This is because it is difficult to measure a posture of a vein pattern directly. For example, the positional relation between the image unit 152 and the palm is determined as FIG. 4.

In a reference coordinate system, a center "O" of a camera lens of the image unit 152 is an original point. Axes that are at a right angle in a plane that is vertical to an optical axis of the image unit 152 are an X-axis and a Y-axis. The optical axis of the image unit 152 is a Z-axis. A unit of each axis is a millimeter. In a coordinate fixed to a palm, a center (for example, a center of gravity) of a surface of a palm is a representative point "O'". A direction from the representative point "O'" toward a wrist is a Y'-axis. A direction from the representative point "O'" toward a reverse face of the palm is a Z'-axis. A direction at a right angle with the Y'-axis and the Z'-axis is an X'-axis. The palm may be a right hand or a left hand.

The position of the palm is expressed by a coordinate value of the representative point "O'" of the reference coordinate system. For example, (0, 10, 40) means that the representative point "O'" is positioned at 0 millimeter in the X-axis, at 10 millimeters in the Y-axis and at 40 millimeters in the Z-axis.

The direction of the palm is expressed by a rotation amount of the X'-axis, the Y'-axis and the Z'-axis of the coordinate fixed to the palm. There is a 3×3 rotation matrix in which unit vectors of the X'-axis, the Y'-axis and the Z'-axis are arrayed, as an expression method of the rotation amount. For example, the following formula (1) means that there is no rotation (X'=X, Y'=Y, Z'=Z). In this case, the palm is held in parallel with the image unit 152.

$$\begin{pmatrix} 1 & 0 & 0 \\ 0 & 1 & 0 \\ 0 & 0 & 1 \end{pmatrix} \quad \text{[Formula 1]}$$

A method using an Euler angle, in which a group of rotation angles of a phase where an objective is rotated by an angle of $\theta_1$ around an X'-axis, is rotated by an angle of $\theta_2$ around a Y'-axis, and is rotated by an angle of $\theta_3$ around a Z'-axis from a phase without rotation, may be used as another expression method of the rotation amount. The group of rotation angles may be expressed as $(\theta_1, \theta_2, \theta_3)$. For example, (10, 20, 15) indicates that a palm is rotated by an angle of 10 degrees, an angle of 20 degrees, and an angle of 15 degrees around each axis from a phase where the palm is held in parallel with the image unit 152.

A shape of the palm is expressed by an overall turning as a scale. In concrete, a non-dimensional amount in which an inverse number of a radius of a sphere when the palm is approximated by a spherical surface is multiplied by a size of the palm is used. The size of the palm can be determined by a distance between two points that are the furthest in the palm. The distance between the two points is equal to a product between the size of the palm and an average curvature factor. When the distance between the two points is zero, the palm is flat. More details can be used as the shape of the palm. For example, a rotation angle of a joint of each finger (unit: degree) may be used.

Next, a description will be given of an example of posture calculation by the posture calculation unit 10. First, a method using an outline of a palm is used is described. A background is brightly expressed, a palm is slightly darkly expressed, and veins are expressed the most darkly in an image taken by the image unit 152. It is therefore possible to convert the image taken by the image unit 152 into three values as follows.

The posture calculation unit 10 converts a pixel larger than a first threshold into a value "0" indicating a background. The posture calculation unit 10 converts a pixel that is larger than a second threshold (<the first threshold) and is equal to the first threshold or less into a value "2" indicating a palm. The posture calculation unit 10 converts a pixel that is equal to or smaller than the second threshold into a value "1" indicating a vein. Thus, the posture calculation unit 10 converts each pixel into one of three values.

The first threshold is set to be a value that is smaller than a pixel value of an average background. When the pixel value is within 0 to 255, for example, "150" can be used as the first threshold. The second threshold is set to be a value that is larger than a pixel value of an average vein. When the pixel value is within 0 to 255, for example, "60" can be used as the first threshold.

The posture calculation unit 10 scans all pixels one by one after the three-value conversion. When an objective pixel of the scan is the value "2" indicating a palm and an adjacent pixel is the value "0" indicating a background, the posture calculation unit 10 converts the objective pixel into a value "4" indicating an outline. Thus, the outline of the palm and the vein pattern are detected.

The posture calculation unit 10 may calculate a large indefinite number of postures of the palm before the above-mentioned registration process, and the storage unit 50 may store the results. For example, a large indefinite number of palms are prepared and are fixed with an apparatus, and the image unit 152 takes images of various postures. When a palm holds a transparent ball of which radius is determined, a shape of a palm can be set. It is preferable that each finger is fixed with an apparatus having a ring shape, when a joint angle of each finger is set. The posture calculation unit 10 calculates an outline with use of the above-mentioned method with respect to each image of the large indefinite number of palms. The storage unit 50 stores the calculated postures. The posture calculation unit 10 calculates an outline of a palm given during the registration process or the biometric authentication process, searches an outline that is the most similar in the outlines stored in the storage unit 50, and outputs a palm posture of which outline is taken, as a calculation result. A degree of a ratio between a common outline portion and a common non-outline portion can be used as a similarity of outline. That is, a sum of a ratio of pixels that are determined as an outline and a ratio of pixels that are determined as not outline can be used.

A method using only an average outline or a part of an outline of each person may be used in order to reduce a storage capacity of the storage unit 50. A method of measuring a prepared palm with three dimensions and generating an outline in a computer based on the measured palm with a method of computer graphics may be used. An example of a calculation result of the palm posture is shown in Table 1.

TABLE 1

| QUALITY | VALUE |
| --- | --- |
| POSITION | (0, 10, 40) |
| DIRECTION | (10, 20, 15) |
| SHAPE | 0 |

The following technology may be used as another method of posture calculation, in addition to the above-mentioned methods. For example, there are methods of a technology of providing a measure unit that measures a distance between an apparatus and a part of body, a technology of using an unevenness of incident light intensity of an image, a technology of using a stereo measurement with use of a plurality of cameras, a technology of using a motion parallax with use of a plurality of images, and so on.

A radiation unit that radiates a visible light and an image unit that takes an image of the visible light may be further provided, and an imaging with a visible light may be used in combination. It is difficult for the visible light to get into inner side of a palm. Therefore, the visible light is suitable for measuring a wrinkle that is a pattern of a palm or an outline and a distance to a surface of a palm. It is possible to determine a posture of a palm with use of the measurement result. For example, a posture can be calculated when a wrinkle is measured by a motion parallax or a stereo measurement, a three-dimensional coordinate of each wrinkle is obtained, and a palm is approximated by a spherical surface. In this case, the radiation unit 151 has only to have an LED emitting a near-infrared light and an LED emitting a visible light, and the image unit 152 has only to have a camera taking an image of the near-infrared light and another camera taking an image of the visible light.

When a rotation angle of a joint of each finger is used as a shape of a palm, the posture of a palm can be calculated by the following methods. For example, (1) a direction of an extension of a finger is obtained in an image in accordance with an outline of a palm. (2) A position of a wrinkle that is at a right angle with the direction of extension of a finger in accordance with the detection result of the wrinkle is determined as a joint. (3) A distance to an image portion with respect to two points crossing the joint is calculated, and a rotation angle of the joint is obtained from the calculated distance.

Figure 5:
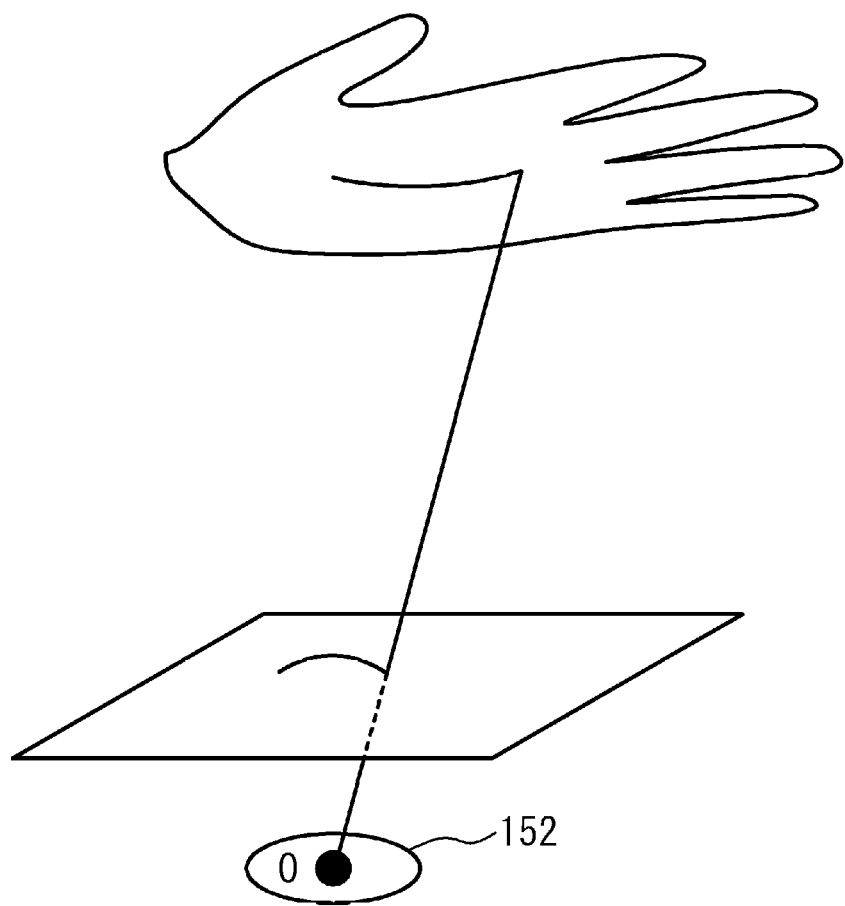
FIG. 5 illustrates a schematic view for describing details of a three-dimensional shape of a vein pattern.

FIG. 5 illustrates a schematic view for describing details of a three-dimensional shape of a vein pattern, and illustrates a relation between a two-dimensional vein pattern and a three-dimensional vein pattern of an image. As illustrated in FIG. 5, the three-dimensional vein pattern existing in a real world can be projected to the two-dimensional vein pattern of the image by a perspective projection with the lens center "O" of the camera being an original point. Depth information (height information) is lost by the projection. Therefore, it is necessary to obtain a height of each point structuring a vein pattern in order to restore the three-dimensional shape from the two-dimensional shape. The two-dimensional vein pattern is expressed by a group of pixels classified into veins in the image, as the result of the process of the posture calculation unit 10. When a center point of the pixels is obtained, the two-dimensional vein pattern can be considered as a two-dimensional point sequence. In this case, corresponding three-dimensional vein pattern can be considered as a three-dimensional sequence.

Next, a description will be given of an example of a calculation of a three-dimensional shape by the three-dimensional shape calculation unit 20. For example, a motion parallax can be used. The three-dimensional shape calculation unit 20 obtains a two-dimensional vein pattern of an image with respect to a plurality of images taken by the image unit 152 at a given interval (for example, 33 milliseconds). The three-dimensional shape calculation unit 20 considers a three-dimensional vein pattern as a rigid body of which shape is unchangeable in an imaging time for taking the images. A motion of the rigid body can be expressed by three parameters indicating a translational motion (translational motion speed) and three parameters indicating a rotational motion (rotational speed).

The three-dimensional shape calculation unit 20 considers a height of each point of a vein pattern, a translational motion speed and a rotational speed at a starting time as an unknown quantity. A center point of pixels classified into veins is used as an each point of a vein pattern. The three-dimensional shape calculation unit 20 sets a random number to the height of each point, the translational speed and the rotational speed of the vein pattern. The three-dimensional shape calculation unit 20 generates a two-dimensional vein pattern simulated at each time from the two-dimensional vein pattern at the starting time with use of the height of each point, the translational motion speed and the rotational speed that are set in advance. In concrete, the two-dimensional vein pattern is generated by the following method. The three-dimensional vein pattern at the starting time can be determined, because the height of each point is given. Next, the three-dimensional shape calculation unit 20 calculates a three-dimensional vein pattern of each time by a parallel displacement and a rotation of the three-dimensional vein pattern of the starting time with use of a given translational motion speed and a rotational speed. Finally, the three-dimensional shape calculation unit 20 generates a two-dimensional vein pattern that is simulated at each time by projecting the three-dimensional vein pattern s of each time.

The three-dimensional shape calculation unit 20 compares actual two-dimensional vein pattern s calculated at each time and the simulated two-dimensional vein pattern s, and calculates a similarity of them. A sum of a ratio of a common vein portion and a ratio of a common non-vein portion (a ratio of pixels that are determined as a vein and a ratio of pixels that are determined as non-vein) may be used as the similarity. The three-dimensional shape calculation unit 20 compares the calculated similarity with a maximum value of the similarity that is calculated before now. When the similarity indicates a maximum, the storage unit 50 stores the height, the translational motion speed and the rotational speed. The three-dimensional shape calculation unit 20 repeats the above-mentioned processes a predetermined times, and obtains the height, the translational motion speed and the rotational speed that indicate the maximum from the storage unit 50.

A three-dimensional shape of a vein pattern is, for example, expressed with a three-dimensional coordinate of each point structuring the vein pattern having a unit of a millimeter, based on the height of each point calculated above. A calculation result is shown in Table 2.

TABLE 2

| POINT 1 | (10, 10, 40) |
|---|---|
| POINT 2 | (11, 10, 40) |
| ... | ... |
| POINT 1200 | (−10, −10, 40) |

A stereo measurement using a plurality of cameras may be used as another example. Although a three-dimensional shape of a vein pattern is obtained independently from the posture calculation result of a palm, the posture calculation result may be used. Some methods are described as follows.

The three-dimensional shape calculation unit 20 does not calculate a height of each point of a vein pattern completely at random, but may calculate the height at random so that the height is within a depth range from a palm surface (for example, 0 to 5 millimeters). This is because veins are positioned at a given depth (a few millimeters) from the palm surface.

The three-dimensional shape calculation unit 20 may use a motion parallax of which objective is a wrinkle of an image taken with use of a visible light and may calculate a three-dimensional shape of the wrinkle and a rigid body motion of a palm. In this case, the rigid body motion of the palm is treated as known in the calculation of the three-dimensional shape of the vein pattern.

The calculated three-dimensional shape may be normalized with use of the posture calculation result. A description will be given of an example. First, a radius of a sphere and a coordinate of a representative point (a center of a palm) when a palm is approximated with a hemisphere face from the posture calculation result are obtained. A mapping of a point where a hemisphere face is copied to a reference posture (a face having an inclination degree of zero and having a height of millimeter that is placed at a center of an image) is determined in advance with the same method as a mapping. When the mapping is adapted to the three-dimensional shape of the vein pattern, a normalized three-dimensional vein pattern in a case where a palm is at a reference posture.

When a rotational angle of a joint of a finger is used as a shape of a palm, a three-dimensional vein pattern in which a finger is extended may be normalized with used of a calcula tion result of the rotational angle of each joint. Although a group of points is used as a vein pattern, the vein pattern may be expressed by a broken line of which structure point is a feature point such as a branch point or a edge point of the image in order to reduce a storage capacity and speed up the process.

An example of a three-dimensional shape calculated with respect to the above-mentioned holdings of the palm is shown in Table 3. However, only a specific one-dimensional (for example, an axis) position and a direction are shown in order to illustrate the three-dimensional shape in the two-dimensional table. A blank indicates that there is no corresponding three-dimensional shape.

TABLE 3

| | DIRECTION | | | | |
|---|---|---|---|---|---|
| POSITION | −10 DEGREES | −5 DEGREES | ZERO | 5 DEGREES | 10 DEGREES |
| −10 mm | | | $data_{-10,0}$ | | |
| 0 mm | $data_{0,-10}$ | $data_{0,-5}$ | $data_{0,0}$ | $data_{0,5}$ | $data_{0,10}$ |
| 10 mm | | | $data_{10,0}$ | | |

Next, a description will be given of a fluctuation of the calculated three-dimensional shape. The normalized three-dimensional vein pattern does not depend on the posture of the palm, when a palm and a vein can be measured without a measuring error because the palm is an ideal sphere or a plane and the vein exists on a palm surface. In this case, a stable personal authentication is achieved independently from the posture of the palm, when the normalized three-dimensional shape is registered and a three-dimensional shape given during the authentication is compared with the normalized three-dimensional shape. Even if a finger joint is considered in a palm shape, a stable personal authentication can be achieved when a plurality of rigid bodies are connected with a joint.

Figure 6:
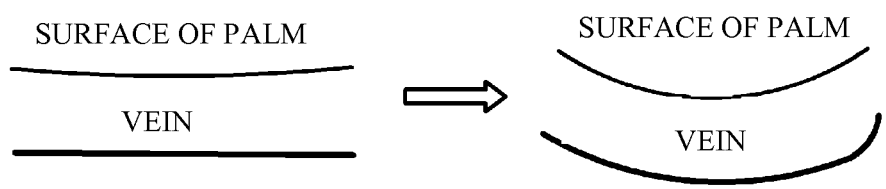
FIG. 6 illustrates an example of a deformation caused by bending as a representative fluctuation of a three-dimensional vein pattern.
Figure 7:
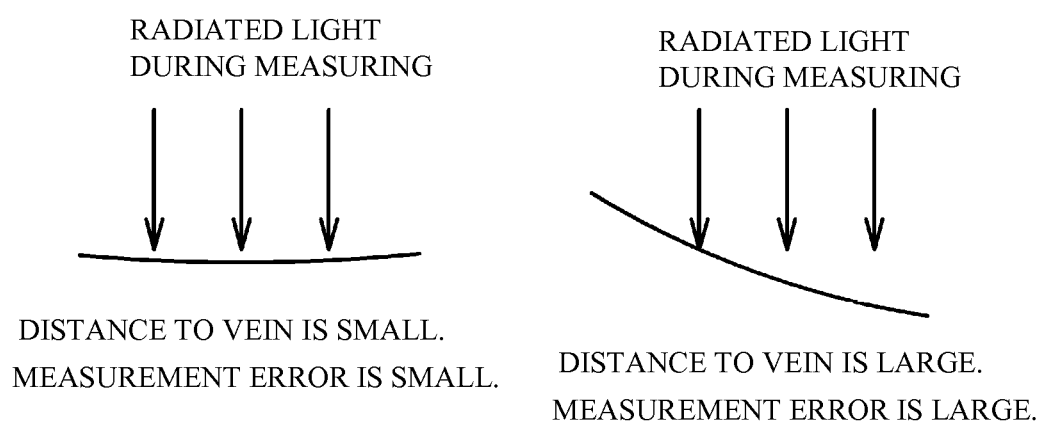
FIG. 7 illustrates an example in which a measurement error differs in accordance with a direction of a palm.

However, actually, the shape of the palm may be complicatedly and variously deformed and is varied by an individual. Further, the vein exists in a palm, and a positional relation between the vein and the palm surface is varied by an individual. Measurement of the palm shape and the vein includes an error. Because of these factors, the three-dimensional vein pattern depends on the palm posture and fluctuates even if the three-dimensional vein pattern is normalized. FIG. 6 illustrates a deformation example accompanied with a bending as a representative fluctuation of the three-dimensional vein pattern. FIG. 7 illustrates an example in which a measurement error differs according to a direction of a palm.

As mentioned above, the fluctuation and the measurement error of the three-dimensional vein pattern greatly depend on the posture of the palm and has a large individual difference. And so, a user is made to take various stances during the registration process, and a three-dimensional shape of a vein pattern from each posture is calculated. Thus, a systematic bias depending on the palm posture can be removed from the measurement error.

Concrete examples of the posture of the user during the registration process are as follows. (1) A palm is opened and is moved back and forth and around with respect to the image unit 152. (2) Next, the palm is returned to a center of the image unit 152 and is inclined back and forth and around. (3) Finally, the palm is returned to the center of the image unit 152 and is closed and opened. When the palm is held as above, a burden of the user during the registration is small, and a convenience is not degraded.

The three-dimensional structure extract unit 30 considers one of posture of the registration process as a standard posture, and extracts a three-dimensional shape at the time as a three-dimensional structure. That is, any of a plurality of three-dimensional shapes may be extracted as the three-dimensional structure. A phase, where a palm is held at a center of an image at a height of 40 millimeters and a posture has an inclination degree of zero and is not bended, is used as a standard posture.

There may be a method of using an average of a plurality of three-dimensional shapes, as another method of determining a three-dimensional structure other than the above-mentioned method. The method of calculating an average in a case where a three-dimensional vein pattern is expressed by a three-dimensional coordinate of points structuring a vein pattern is as follows. It is necessary to relate points of the three-dimensional vein pattern s having a different posture in order to operate an average. A method of relating points is as follows. Points having the closest three-dimensional distance between the three-dimensional shape of the standard posture and another three-dimensional shape of another posture are related to each other. However, when the three-dimensional distance is larger than a threshold (for example, 5 millimeters), a new point is added to the three-dimensional shape of the standard posture. When the new point is added, each point of the three-dimensional shape of the standard posture and each point of the three-dimensional shape of another posture are related to each other. An average of coordinate values of the related points is calculated. The calculated average is used as an average of the three-dimensional shape.

The gap calculation unit 40 calculates a difference between the three-dimensional structure extracted by the three-dimensional structure extract unit 30 and each three-dimensional shape during the registration process as an apparent gap. For example, apparent gaps in a case where $data_{0,0}$ is determined as a three-dimensional structure in the three-dimensional shape of Table 3 are shown in Table 4. $\delta_{i,j}$ indicates a difference between $data_{i,j}$ and $data_{0,0}$. The gap calculation unit 40 makes the storage unit 50 store the calculated apparent gap related to an ID of a user input by the input device 160.

TABLE 4

| POSITION | DIRECTION | | | | |
|---|---|---|---|---|---|
| | −10 DEGREES | −5 DEGREES | ZERO | 5 DEGREES | 10 DEGREES |
| −10 mm | | | $\delta_{-10,0}$ | | |
| 0 mm | $\delta_{0,-10}$ | $\delta_{0,-5}$ | 0 | $\delta_{0,5}$ | $\delta_{0,10}$ |
| 10 mm | | | $\delta_{10,0}$ | | |

Figure 8:
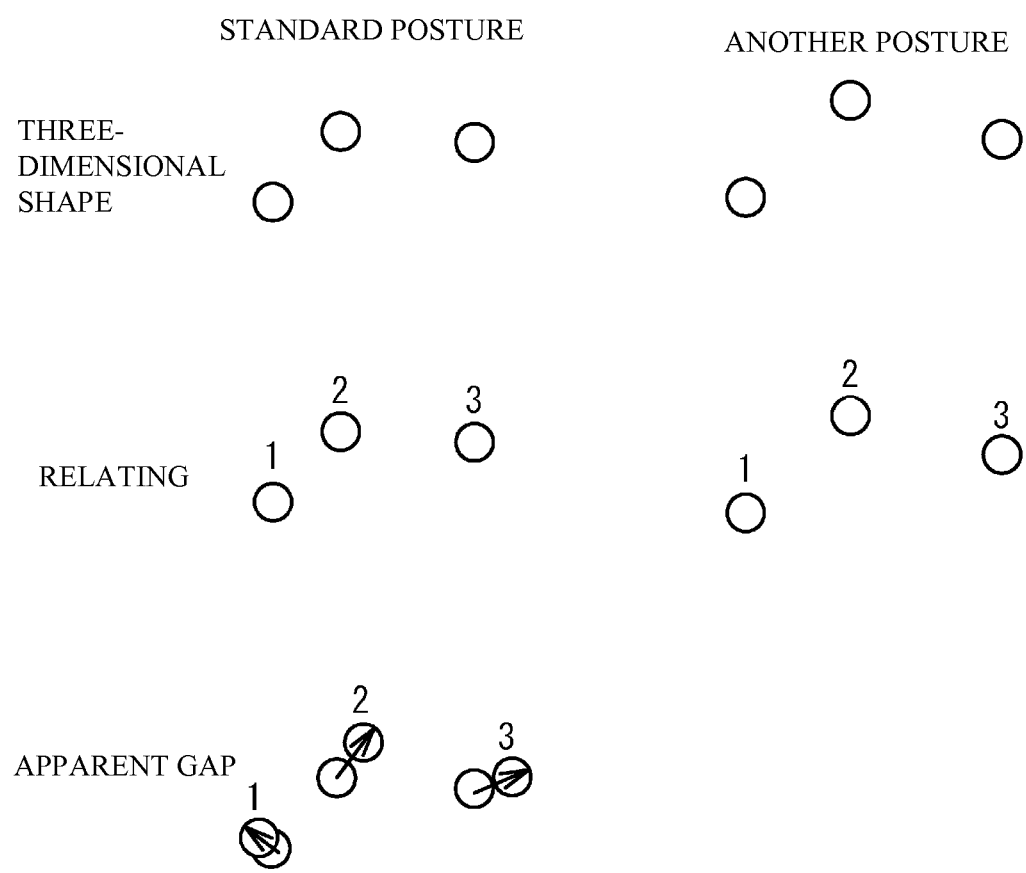
FIG. 8 illustrates a calculation example of an apparent gap.

It is necessary to relate points of three-dimensional vein pattern s having a different posture, when the three-dimensional vein pattern is expressed by a three-dimensional coordinate of points structuring a vein pattern. In this case, points having the closest three-dimensional distance are related to each other. FIG. 8 illustrates a calculation example of an apparent gap. The apparent gap is smaller than the three-dimensional shape with respect to a value. Therefore, a number of digits of significant figures are reduced. And, the apparent gap can be stored in the storage unit 50 with a small data size. Further, the data size can be reduced when a known data compression technology is used. For example, a principal component analysis (PCA) can be used as the data compression technology.

[Biometric Authentication Process]

Figure 9:
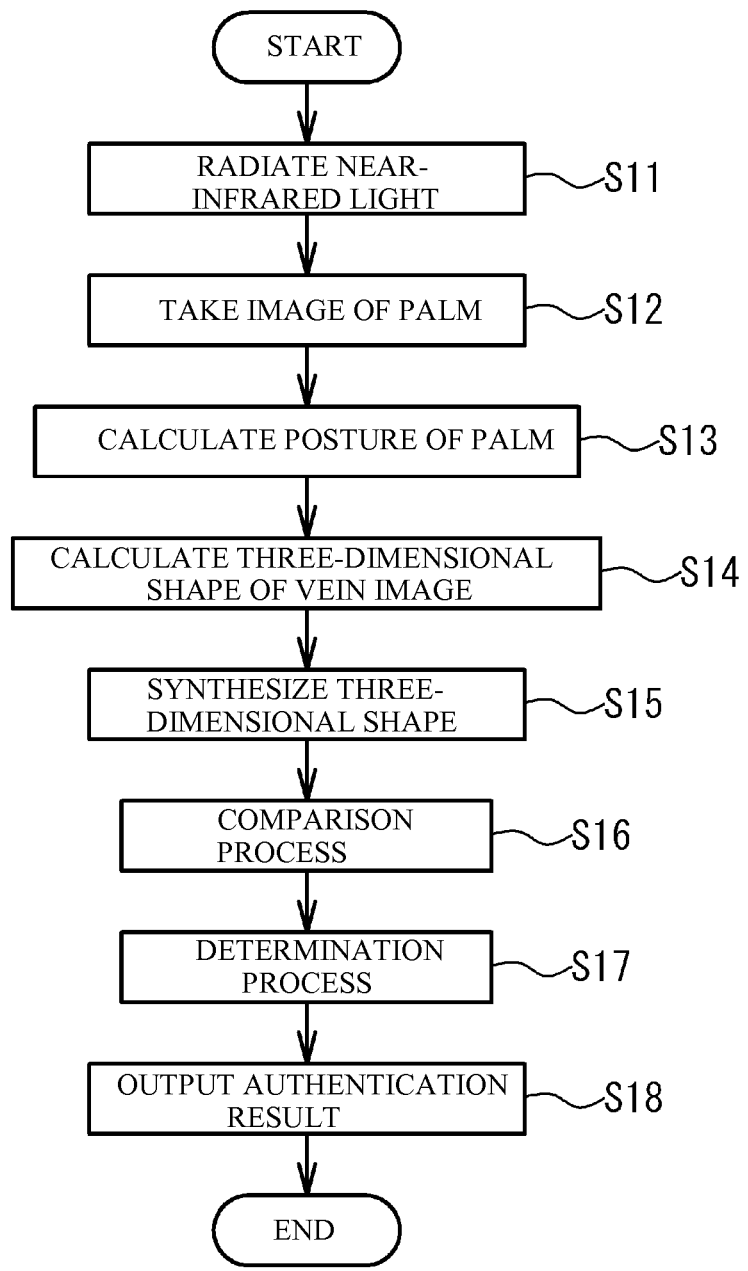
FIG. 9 illustrates an example of a flowchart of a biometric authentication process for authenticating with respect to a body of a user.

Next, a description will be given of a biometric authentication process with reference to FIG. 1, FIG. 2 and FIG. 9. FIG. 9 illustrates an example of a flowchart of the biometric authentication process authenticating a body of a user. The radiation unit 151 radiates a near-infrared light to a palm of a user (Step S11). Next, the image unit 152 takes an image of a palm to which the near-infrared light is radiated (Step S12). Next, the posture calculation unit 10 calculates a posture of the palm (Step S13). Next, the three-dimensional shape calculation unit 20 calculates a three-dimensional shape of a vein pattern of the palm (Step S14).

Next, the three-dimensional shape synthesis unit 60 synthesizes a three-dimensional shape in accordance with the posture calculated by the posture calculation unit 10 (Step S15). Next, the comparison unit 70 compares the three-dimensional shape calculated by the three-dimensional shape calculation unit 20 with the three-dimensional shape synthesized by the three-dimensional shape synthesis unit 60 (Step S16). The determination unit 80 determines whether a similarity calculated by the comparison unit 70 is more than a threshold (Step S17). The determination unit 80 determines that an authentication is succeeded when the similarity calculated by the comparison unit 70 is more than the threshold. The determination unit 80 determines that the authentication is failed when the similarity is equal to the threshold or less. The output unit 90 outputs information of authentication success to the display device 180 when the determination unit 80 determines that the authentication is succeeded, and outputs information of authentication failure to the display device 180 when the determination unit 80 determines that the authentication is failed (Step S18). Thus, the display device 180 displays the information of the authentication success or authentication failure.

An explanation of Step S11 to Step S14 is omitted because the process of Step S11 to Step S14 is the same as that of Step S1 to Step S4. A description will be given of details of Step S15 to Step S17.

The three-dimensional shape synthesis unit 60 synthesizes a three-dimensional shape from the registered biometric authentication data stored in the storage unit 50 with use of a posture of a palm calculated by the posture calculation unit 10 during the biometric authentication process. The synthesis of the three-dimensional shape is preformed through the following two steps. (1) An apparent gap with respect to a given posture is estimated. (2) A three-dimensional shape is calculated from the estimated apparent gap and a three-dimensional structure.

For example, a linear interpolation (extrapolation) method can be used as an estimation method of the apparent gap. For example, two postures, of which posture calculated by the posture calculation unit 10 and apparent gap are the closest, are selected from the postures stored in the storage unit 50. An apparent gap between the two postures is added with a weight in accordance with a distance between the postures. Thus, the estimation is achieved. A root of sum of square of a position difference, sum of square of a direction difference and sum of square of a shape is used as the distance between the postures. A similarity between postures can be measured by the distance. Thus, for example, an apparent gap of a posture when both a thumb and a little finger are bended can be estimated from an apparent gap between a posture when only the thumb is bended and a posture when only the little finger is bended, when a rotation angle of a joint of each finger is used as the palm shape.

The method of calculating a three-dimensional shape from the estimated apparent gap and the three-dimensional structure is achieved when the apparent gap is added to the three-dimensional structure. A result in which the three-dimensional shape is synthesized to all postures of the registration data of Table 4 is shown in Table 5. In Table, only a one-dimensional data of position/direction is shown. With the interpolation, a three-dimensional shape of a vein pattern can be obtained with respect to the posture that is not added during the registration process.

TABLE 5

| POSITION | DIRECTION | | | | |
|---|---|---|---|---|---|
| | −10 DEGREES | −5 DEGREES | ZERO | 5 DEGRERES | 10 DEGREES |
| −10 mm | $data_{-10,-10}$ | $data_{-10,-5}$ | $data_{-10,0}$ | $data_{-10,5}$ | $data_{-10,10}$ |
| 0 mm | $data_{0,-10}$ | $data_{0,-5}$ | $data_{0,0}$ | $data_{0,5}$ | $data_{0,10}$ |
| 10 mm | $data_{10,-10}$ | $data_{10,-5}$ | $data_{10,0}$ | $data_{10,5}$ | $data_{10,10}$ |

The comparison unit 70 calculates a similarity indicating a similarity between two three-dimensional vein pattern s. A correlation coefficient in a case where the two three-dimensional vein pattern s are considered as a data column may be used as the similarity. In this case, it is necessary to relate points. Therefore, points having the smallest distance are considered as related points. The correlation coefficient is within a range of −1 to +1. The larger the correlation coefficient is, the higher the similarity is.

An example of the calculation method is described as follows. A three-dimensional vein pattern that is registered and synthesized has three points. It is assumed that the points are (−10, −10, 40), (0, 0, 40) and (10, 10, 40). A three-dimensional vein pattern given during the biometric authentication process has three points that are (−8, −10, 40), (0, 1, 40) and (11, 11, 40). By calculating a distance between the points, the relating of points are determined in the above-mentioned order. When each vein pattern is considered as nine data columns, the correlation coefficient is calculated by the following formula.

$$\text{CORRELATION COEFFICIENT} = \qquad [\text{Formula 2}]$$

$$\frac{\begin{array}{c}(-10)\times(-8)+(-10)\times(-10)+40\times40+0\times0+\\ 0\times1+40\times40+10\times11+10\times11+40\times40\end{array}}{\sqrt{\begin{array}{c}(-10)^2+(-10)^2+40^2+0^2+\\ 0^2+40^2+10^2+10^2+40^2\end{array}}} \times$$

$$\frac{1}{\sqrt{\begin{array}{c}(-8)^2+(10)^2+40^2+0^2+1^2+\\ 40^2+11^2+11^2+40^2\end{array}}} \approx 0.9993$$

The determination unit 80 compares a calculated similarity with a threshold (for example, 0.99) and determines as an identical person when the calculated similarity is more than the threshold. In the above-mentioned example, 0.9993 is larger than 0.99. Therefore, it is determined as the identical person. Therefore, the output unit 90 outputs information indicating a succeeding of authentication to the display device 180.

In accordance with the embodiment, a three-dimensional shape that is an objective of comparison is synthesized from three-dimensional shapes of postures stored in advance in accordance with a posture of a body calculated during the authentication. Therefore, an influence of the posture of the body can be reduced. Only three-dimensional shapes of a few representative postures have only to be stored because a three-dimensional shape of the body is used, compared to the case where a two-dimensional shape is used. Therefore, the convenience of a user is not degraded. When a number of the stored three-dimensional shape is small, the process of the comparison is simplified. Thus, the process time of the biometric authentication process can be reduced.

In the embodiment, the registered biometric data stored in the storage unit 50 is an apparent gap with respect to a three-dimensional structure. However, the structure is not limited. For example, the storage unit 50 may store a three-dimensional shape of each posture. However, when the apparent gap is stored, a storage capacity can be reduced.

Embodiment 2

Figure 10:
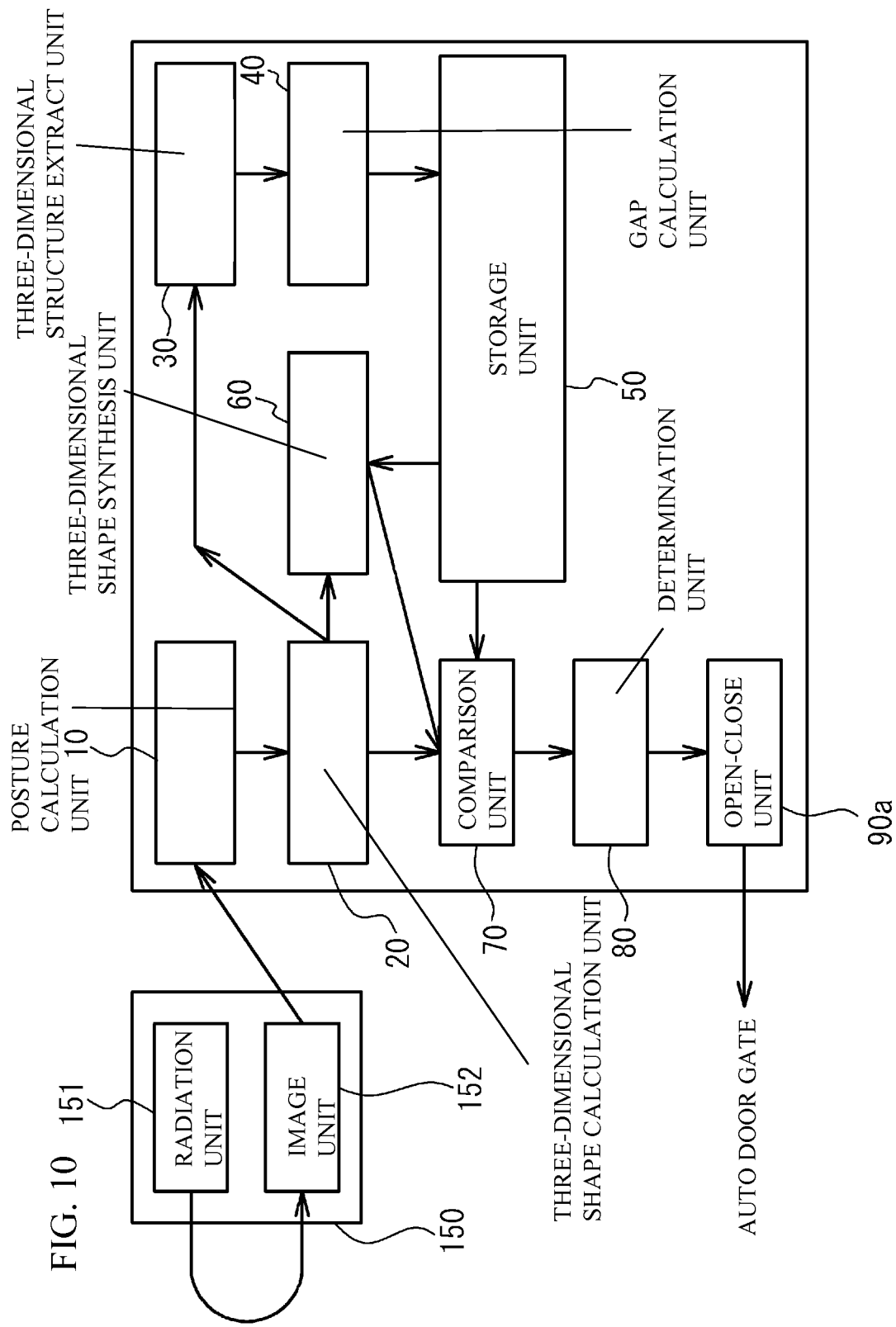
FIG. 10 illustrates a block diagram of each function realized by an execution of a biometric authentication program in accordance with an embodiment 2.

Next, a description will be given of a biometric authentication device 100a in accordance with an embodiment 2. The biometric authentication device 100a is an authentication device performing an administration of entering a room. FIG. 10 illustrates a block diagram of each function realized by an execution of a biometric authentication program in accordance with the embodiment 2. As illustrated in FIG. 10, in the biometric authentication device 100a, an open-close unit 90a is realized instead of the output unit 90.

Figure 11:
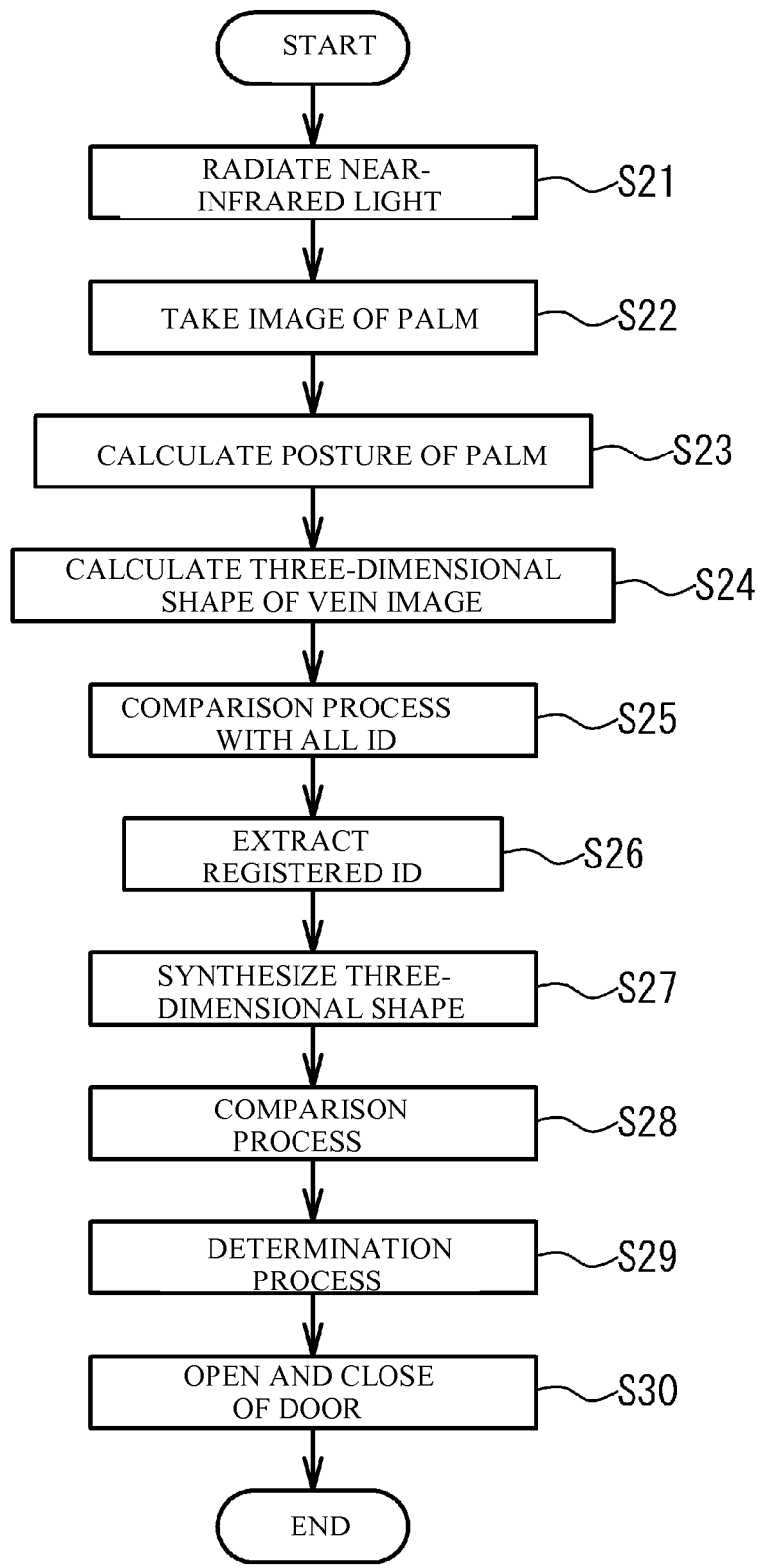
FIG. 11 illustrates an example of a flowchart of a biometric authentication process in accordance with the embodiment 2.

Next, a description will be given of a biometric authentication process in accordance with the embodiment 2. FIG. 11 illustrates an example of a flowchart of the biometric authentication process in accordance with the embodiment 2. The radiation unit 151 radiates a near-infrared light to a palm of a user (Step S21). Next, the image unit 152 takes an image of the palm to which the near-infrared light is radiated (Step S22). Next, the posture calculation unit 10 calculates a posture of the palm (Step S23). Next, the three-dimensional shape calculation unit 20 calculates a three-dimensional shape of a vein pattern of the palm (Step S24).

Next, the comparison unit 70 compares the three-dimensional shape calculated in Step S24 with the three-dimensional structures of the registered biometric data of all users (all IDs) stored in the storage unit 50 (Step S25). The comparison process is speed-up, because a three-dimensional shape is not synthesized. As a result of the comparison process, a similarity between the calculated three-dimensional shape and the three-dimensional structures of all users is calculated. The three-dimensional shape synthesis unit 60 reads biometric registered data of a user of which similarity calculated by the comparison unit 70 is larger than a given threshold (for example, 0.9) (Step S26). Next, the three-dimensional shape synthesis unit 60 synthesizes a three-dimensional shape in accordance with a shape calculated by the posture calculation unit 10 with respect to the user (Step S27). Next, the comparison unit 70 compares the three-dimensional shape calculated by the three-dimensional shape calculation unit 20 with the three-dimensional shape synthesized by the three-dimensional shape synthesis unit 60 (Step S28).

The determination unit 80 determines whether the similarity calculated by the comparison unit 70 is more than a threshold (Step S29). The threshold is larger than the threshold of Step S26, and is, for example, 0.99. The determination unit 80 determines that the authentication is succeeded when the similarity calculated by the comparison unit 70 is more than the threshold, and determines that the authentication is failed when the similarity is equal to or less than the threshold. The open-close unit 90a opens a door when the determination unit 80 determines that the authentication is succeeded, and makes the door close when the determination unit 80 determines that the authentication is failed (Step S30). After that, the execution of the flowchart is finished.

In accordance with the present embodiment, the influence of a posture of a body can be reduced, because a three-dimensional shape that is an objective of the comparison is synthesized from the three-dimensional shapes of a plurality of postures stored in advance in accordance with the posture calculated during the authentication process. The three-dimensional shape is used. Therefore, only three-dimensional shape of representative postures has only to be stored, compared to the case using the two-dimensional shape. Therefore, the convenience of a user is not degraded. When a number of stored three-dimensional shapes is small, the process during the comparison can be simplified. Thus, the process time of the biometric authentication process can be shortened. It is possible to specify an objective user from a plurality of IDs without specifying the user.

Preferred embodiments of the present invention have been described in detail. The present invention is not limited to the specific embodiments but may be varied or changed within the scope of the claimed invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
    a three-dimensional shape calculation unit configured to calculate a three-dimensional shape of a body from biometric information of a user detected by a biometric sensor;
    a storage unit configured to store a three-dimensional shape of a posture of a body of the user in advance before the biometric sensor detects the biometric information and store a difference between a three-dimensional structure that is a specific three-dimensional shape obtained from the three-dimensional shape of the posture and the three-dimensional shape of the posture in advance before the biometric sensor detects the biometric information;
    a posture calculation unit configured to calculate a posture of the body from the biometric information detected by the biometric sensor;
    a synthesis unit configured to synthesize a three-dimensional shape from the difference between the three-dimensional structure and the three-dimensional shape of the posture stored in the storage unit; and
    a comparison unit configured to compare the three-dimensional shape calculated by the three-dimensional shape calculation unit with the three-dimensional shape synthesized by the synthesis unit.

2. The biometric authentication device as claimed in claim 1, wherein the synthesis unit is configured to synthesize the three-dimensional shape by interpolating a posture that is not stored in the storage unit from a plurality of postures that are stored in the storage unit and using the posture obtained by the interpolating.

3. The biometric authentication device as claimed in claim 1 wherein the synthesis unit is configured to synthesize the three-dimensional shape from the posture of the body calculated by the posture calculation unit with use of the difference stored by the storage unit when a similarity between the three-dimensional shape calculated by the three-dimensional shape calculation unit and the three-dimensional structure is equal to or more than a predetermined value.

4. The biometric authentication device as claimed in claim 1, wherein the three-dimensional shape of the posture is a plurality of three-dimensional shapes calculated by the three-dimensional shape calculation unit from biometric information of the user that is detected by the biometric sensor in advance.

5. The biometric authentication device as claimed in claim 1, wherein:
    the body is a palm vein; and
    the posture of the body is a posture of a palm surface.

6. The biometric authentication device as claimed in claim 1, wherein the three-dimensional shape calculation unit normalizes the three-dimensional shape according to the posture calculated by the posture calculation unit.

7. The biometric authentication device as claimed in claim 1, wherein the three-dimensional shape calculation unit calculates a three-dimensional coordinate of a surface pattern of the body as the three-dimensional shape by taking an image with a visible light.

8. A biometric authentication method comprising:
    calculating a three-dimensional shape of a body from biometric information of a user detected by a biometric sensor;
    storing a three-dimensional shape of a posture of a body of the user in a storage unit in advance before the biometric sensor detects the biometric information and storing a difference between a three-dimensional structure that is a specific three-dimensional shape obtained from the three-dimensional shape of the posture and the three-dimensional shape of the posture in the storage unit in advance before the biometric sensor detects the biometric information;
    calculating a posture of the body from the biometric information detected by the biometric sensor;
    synthesizing a three-dimensional shape from the difference between the three-dimensional structure and the three-dimensional shape of the posture stored in the storage unit; and
    comparing the three-dimensional shape calculated from the biometric information of the user with the synthesized three-dimensional shape.

9. A non-transitory computer-readable recording medium having stored therein a program for causing a computer to execute a process, the process comprising:
    calculating a three-dimensional shape of a body from biometric information of a user detected by a biometric sensor;
    storing a three-dimensional shape of a posture of a body of the user in a storage unit in advance before the biometric sensor detects the biometric information and storing a difference between a three-dimensional structure that is a specific three-dimensional shape obtained from the three-dimensional shape of the posture and the three-dimensional shape of the posture in the storage unit in advance before the biometric sensor detects the biometric information;
    calculating a posture of the body from the biometric information detected by the biometric sensor;
    synthesizing a three-dimensional shape from the difference between the three-dimensional structure and the three-dimensional shape of the posture stored in the storage unit; and
    comparing the three-dimensional shape calculated from the biometric information of the user with the synthesized three-dimensional shape.

* * * * *